United States Patent [19]

Feigenbaum et al.

[11] Patent Number: 5,305,461
[45] Date of Patent: Apr. 19, 1994

[54] METHOD OF TRANSPARENTLY INTERCONNECTING MESSAGE PASSING SYSTEMS

[75] Inventors: Barry A. Feigenbaum; Mark A. Fiechtner, both of Boca Raton; Darren M. Miclette, Delray Beach, all of Fla.

[73] Assignee: International Business Machines Corporation, Armonk, N.Y.

[21] Appl. No.: 862,912

[22] Filed: Apr. 3, 1992

[51] Int. Cl.5 .................................................. G06F 9/30
[52] U.S. Cl. ...................................... 395/775; 395/425
[58] Field of Search ........................ 395/775, 425, 200; 364/228.2, 232.1, 280, 284, 284.3, 978.1, 200, 900

[56] References Cited

U.S. PATENT DOCUMENTS 4,694,396  9/1987  Weisshaar et al. .................. 364/200
5,047,925  9/1991  Kun et al. ............................ 364/200

OTHER PUBLICATIONS

Robert Orfali and Dan Harkey, "Client-Server Programming with OS/2", Van Nostrand Reinhold, 1991, pp. 213–225.

IBM Corporation, "IBM Operating System/2 Programming Tools and Information; vol. 1, Version 1.2", 1989, pp. 9-52–9-58.

Harvey M. Deitel, "An Introduction to Operating Systems", Addison-Wesley, 1990, pp. 796 & 807.

IBM Corporation, "IBM Operating System/2 Programming Tools and Information Version 2", 1989, pp. 24-1-24-7.

Primary Examiner—Dale M. Shaw
Assistant Examiner—Moustafa Meky
Attorney, Agent, or Firm—Paul W. O'Malley; Andrew J. Dillon

[57] ABSTRACT

A method of passing data between objects located distributed among a plurality of virtual address space domains established by processes executing on a data processing system comprises several steps. First, a session initiation message from a source object in a domain is broadcast to other objects in the domain. Responsive to receipt of the session initiation message by a domain agent (a type of object) for the domain, forwarding the session initiation message from the domain agent to each of a plurality of domain agents in other virtual address space domains. Responsive to receipt of the session initiation message by the domain agent for a second domain, transmitting the session initiation message from the domain agent for the second domain to an agent object in the second domain for the source object. Finally, responsive to receipt of the session initiation message by the agent object for the source object, establishing a session between the agent object for the source object and a target object for passage of data.

17 Claims, 5 Drawing Sheets

METHOD OF TRANSPARENTLY INTERCONNECTING MESSAGE PASSING SYSTEMS

BACKGROUND OF THE INVENTION

1. Technical Field

The invention relates to passing data between named objects on a data processing system and more particularly to passing data between objects located in different virtual address space domains on the data processing system. Still more particularly, the invention relates to the transparent association of facilities to transfer data between such objects without other modification of a source object or a target object.

2. Description of the Related Art

A virtual machine is a functional simulation of a computer and its associated devices. A plurality of virtual machines may be executed concurrently on a computer system under the control of a suitable operating system. For example, microcomputer systems based upon either the Intel 80386 microprocessor or the 80486 microprocessor and utilizing an OS/2 ® version 2.0 operating system available from International Business Machines Corporation have considerable capacity for executing multiple concurrent processes. Such systems can support emulation of a plurality of concurrent virtual machines, particularly virtual disk operating system machines ("VDMs"). Disk operating systems ("DOS") exist in several versions, such as PC-DOS used on early IBM personal computers and MS-DOS (numerous versions) used on personal computers designed for compatibility with the Industry Standard Architecture. (MS-DOS is a registered trademark of Microsoft, Inc.).

To the user, one desktop personal computer can appear to simultaneously function as two or more Intel 8086 microprocessor based machines utilizing distinct DOS versions, e.g. MS-DOS versions 2.0 or 3.2. This allows the user to run DOS version specific application programs, such as games, word processing programs, or other applications by running the appropriate DOS version on a VDM.

Each virtual machine is an example of a process, or collection of processes, which may be displayed to the user on the system display device in its own window or represented as a icon. A process is current when allocated some physical location in computer memory. The term "computer memory" is used here in reference to program addressable storage from which instructions and other data can be loaded directly into registers of the central processing unit for subsequent execution or other utilization.

Where a plurality of processes are concurrent on a computer, or where insufficient space exists in a computer memory to satisfy the addressing capability of the computers operating system, virtual storage is employed to satisfy the demands for memory of the various current processes. In virtual storage the concepts of address space and actual physical computer memory locations are separated. In a classical virtual storage system, there exist a fixed number of actual, physical words of memory. The address space of the computer, or VDM, is mapped onto physical computer memory by translating addresses in the virtual address space into physical memory locations. Where available computer memory is too small to provide an actual location for each address, a portion of the address space resides outside of computer memory in an auxiliary memory device.

Conventional virtual storage systems determine when a portion of a virtual storage address space (e.g. a page of memory) addressed by a virtual machine is not physically present in computer memory. The storage system then determines the location of the desired data in auxiliary memory, loads the data into computer memory and modifies the memory map to reflect that the virtual storage addresses accessed now relate to locations in computer memory.

Virtual storage may be regarded as addressable main storage by the user of a computer in which virtual addresses are mapped into real addresses of the computer memory or into auxiliary memory. The size of virtual storage is limited only by the addressing scheme of the computer and its operating system and by the amount of auxiliary memory available, such a disk drives or tapes. Thus virtual storage is not limited by the actual number of physical locations in computer memory. The practical implication of this arrangement is that some of the instructions and the data for a process will not physically be in computer memory, even though they may be addressed as though they were.

Each current VDM on a computer has its own virtual storage address space or domain. A useful feature to provide with a plurality of concurrent processes is the ability to transfer data from one domain to another domain. Traditional message passing systems provide for establishment of a "session" between source (sending) and target (receiving) objects. A session is the association of facilities necessary for establishing, maintaining and releasing connections for communications between objects.

During the phase of establishing communications, objects locate one another within a domain (often with the assistance of system services provided by the operating system). Typically a form of broadcast message is sent by a source object to all possible target objects within the domain. Some possible target objects will respond to the broadcast message with an acknowledge message, which may be positive or negative. Some objects will not respond. A list of objects acknowledging the broadcast message positively will be generated and the source object will be joined with one or more acknowledging objects in sessions as appropriate.

The next phase of message passing is a transaction phase. One or more transactions, each marking a message may occur in both directions of a session between the source and a target object. No direct addressing of objects occurs in this phase, nor are broadcast messages used.

Finally, termination of a session must be provided for. By closing a session, the facilities required for establishing and maintaining the session, such as computer memory, are released. Any new session of course requires repeating the procedure from the beginning with a broadcast message from a new source object.

To establish a session between objects they must lie in one domain. If the objects cannot "locate" one another no session can be established. The limits the ability of objects in different domains to communicate with one another.

Objects generated by numerous prior art application programs include the ability to establish intradomain sessions. There also exist methods for bridging domains to allow transfer of data between domains. However, many prior art application programs, suitable for execution on VDMs, generate objects not capable of recognizing the tools provided by the underlying operating system for establishing such bridges.

SUMMARY OF THE INVENTION

It is therefore one object of the invention to provide a method and system for passing data between named objects on a data processing system.

It is another object of the invention to provide a system and method for establishing sessions for the passing of data between objects located in different virtual address space domains on the data processing system.

It is yet another object of the invention to provide a system and method for the transparent association of facilities for the transfer of data between such objects in different domains without other modification of the source object or the target object.

The foregoing objects are achieved as is now described. A method of passing data between objects located distributed among a plurality of virtual address space domains established by processes executing on a data processing system comprises several steps. First, a session initiation message from a source object in a domain is broadcast to other objects in the domain. Responsive to receipt of the session initiation message by a domain agent (a type of object) for the domain, forwarding the session initiation message from the domain agent to each of a plurality of domain agents in other virtual address space domains. Responsive to receipt of the session initiation message by the domain agent for a second domain, transmitting the session initiation message from the domain agent for the second domain to an agent object in the second domain for the source object. Finally, responsive to receipt of the session initiation message by the agent object for the source object, establishing a session between the agent object for the source object and a target object for passage of data.

The method further comprises steps for establishing a session in the reverse direction. An acknowledge message is transmitted from the target object to the agent object for the source object.

Responsive to receipt of the acknowledge message by the agent object for the source object, the acknowledge message is transmitted from the agent object for the source object to a domain agent for the second domain. Responsive to receipt of the acknowledge message by the domain agent for the second domain, the acknowledge message is transmitted to the domain agent for the domain including the source object. Further responsive to receipt of the acknowledge message by the domain agent for the domain of the source object, the acknowledge message is transmitted to an agent object for the target agent in the source object domain.

Responsive to receipt of the acknowledge message by the agent object for the target object, a session between the agent object for the target object and the source object for passage of data is established.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
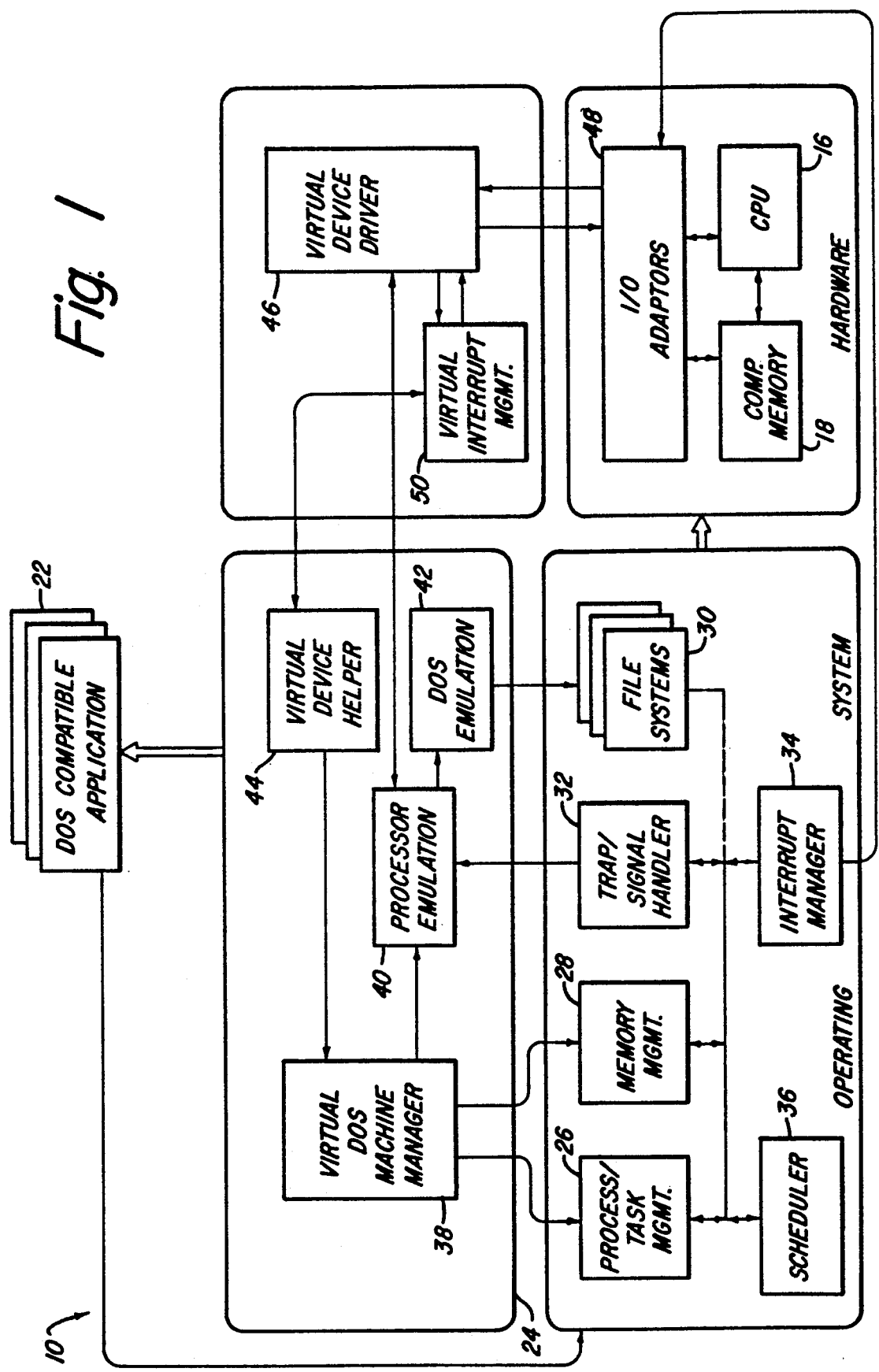
FIG. 1 is a high level block diagram software and hardware components of a data processing system which may be utilized to implement the method and system of the present invention.

With reference now to the figures and in particular with reference to FIG. 1, there is depicted a high level block diagram illustrating software and hardware components of a data processing system 10 which may be utilized to implement the method and system of the present invention. Data processing system 10 includes an operating system kernel 12 which resides in a hardware system 14. The operating system 11 is preferably provided by the OS/2 operating system, version 2.0 or later, available from International Business Machines Corporation. Hardware system 14 includes at minimum a central processing unit (CPU) 16 and a computer memory 18. CpU 16 is preferably an Intel 80386 or 80486 microprocessor or their equivalent. Hardware system 14 further preferably includes input/output adapters 20. The depiction of operating system 12 is simplified for the sake of clarity, and includes such features as are helpful for understanding the system and method of the present invention.

Also depicted in FIG. 1 are user applications 22 which access selected procedures within one of a plurality virtual DOS machines 24 in which the particular application is running, and which may access selected procedures within operating system kernel 12. As is typical in such systems, selected procedures within operating system kernel 12 are designed to be called or invoked by applications within virtual DOS machines 24 through the VDM. Thereafter the task will return to the user program which invoked the operating system kernel procedure. In this manner, operating system kernel 12 acts as an interface between the user of data processing system 10 and hardware system 14.

Operating system kernel 12 is utilized to provide an environment in which various processes such as Virtual DOS machines 24 may be executed. Operating system kernel 12 provides for the efficient utilization and prevents processes from interfering with the proper operation of data processing system 10 by controlling the creation and alteration of files, the control of input/output devices and the provision of multiple device drivers which permits data processing system 10 to interface with various external devices. More particularly, operating system 12 provides for multitasking thereby permitting a plurality of concurrent virtual DOS emulations to occur. Each virtual DOS machine 24 is a process.

Still referring to FIG. 1, it may be seen that operating system kernel 12 includes multiple subsystems, including process/task management system 26 which is utilized to provide task creation, deletion, status and synchronization functions. Control of the status of tasks from a process, which are running, ready to run, or not ready to run, is essential for scheduling of tasks for CPU 16. Next, memory management system 28 is depicted. Memory management system 28 allocates and unallocates portions of computer memory 18 for data processing system 10. This is an essential for any system utilizing virtual storage, as do each virtual DOS machine 24 supported by system 10.

File systems 30 are preferably utilized to control the creation and deletion of files. A file is a named set of records stored or processed as a unit by a data processing system, such as a process. Another aspect of files typically addressed within an operating system kernel is control of access to the files. Access control is utilized to ensure that an access to a file or directory is checked for correctness.

Trap and signal handler 32 is also depicted within operating system kernel 12 and is utilized to respond to traps and signals typically activated by hardware system 14. Among the signals generated by hardware 14 are page fault signals, indicating operations relating to computer memory 22 and auxiliary memory accessed through I/O adapters 48. Such page fault signals are subdivided into two categories corresponding to the type of memory being accessed. Page reclaim operations relate to a memory paging operation limited to computer memory 18 A page fault requiring I/O operations is the second category.

Interrupt manager 34 preferably manages interrupt handlers which are set up by the operating system kernel 12 and kernel extensions to take whatever action is necessary to respond to the occurrence of an interrupt. Next, scheduler 36 is depicted. Scheduler 36 orders specific tasks for dispatch to the processor upon indication that a task has the status "ready to run". Good design of the scheduling algorithm provides both effective use of central processing unit 16 by the various tasks and smooth response to user requests of data processing system 10.

Operating system 12 supports the emulation of a virtual DOS machine 24. Virtual DOS machine 24 in turn provides an operating environment for running DOS compatible application programs 22. Virtual DOS machine 24 includes a virtual DOS machine manager 38, a processor emulation routine 40 which preferably emulates an Intel 8086 microprocessor, DOS emulation 42, and a virtual device helper service 44 provided by the virtual DOS machine manager.

DOS emulation 42 can support different DOS versions on different virtual machines 24. This allows DOS version specific applications to be run on particular virtual DOS machines. Processor emulation 40 provides routing services for traps caused by application 22 interrupts and accesses to virtual device driver 46, allowing the latter to be emulated correctly. Virtual device drivers 46 can utilize physical device drivers directly generated by operating system 12 to access hardware through input/output adaptors 48.

Virtual DOS machine manager 38 creates, terminates and controls a virtual DOS machine 24. Virtual DOS machine 24 creation occurs upon manager 38 calling operating system 12 to create a process and initialization of the components described above. Virtual DOS machine 24 termination occurs when the application running on the machine is discontinued, or when the user orders its termination. Control of operations of the virtual DOS machine manager 38 relate in part to activities engaged in when operating system 12 notifies the manager that the window in which it is displayed has become active. At such times the Virtual DOS machine manager 38 notifies virtual device drivers 46 for the mouse, keyboard and video monitor of the computer system to reset virtual device to real device mappings. Virtual interrupt management 50 emulates operating system interrupt management.

Figure 2:
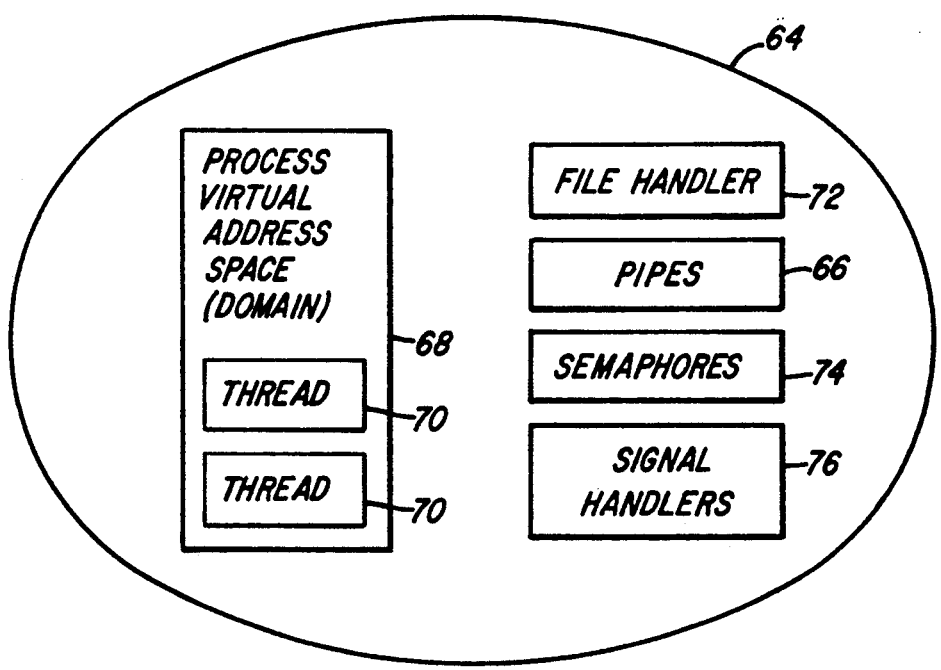
FIG. 2 is a block diagram illustration of the structure of a computer process utilized to implement the method and system of the invention.

FIG. 2 is a block diagram illustration of the structure of a computer process. A process 64 is created whenever a program is loaded from auxiliary memory into computer memory 22. A process is also the platform for the sharing of resources of system 10, including particularly the interprocess communication structures provided by pipes 66. The process domain 68 is conceptually interchangeable with the process virtual address space, which is unique to the process and into which the program is loaded upon creation of the process. Process 64 thus cannot directly access computer memory 22. Processes are not per se executed. Rather, one or more executable threads 70 exist which sequence of instructions for execution. File handlers 72, semaphores 74 and signal handlers 76 provide for interaction with the operating system.

Figure 3:
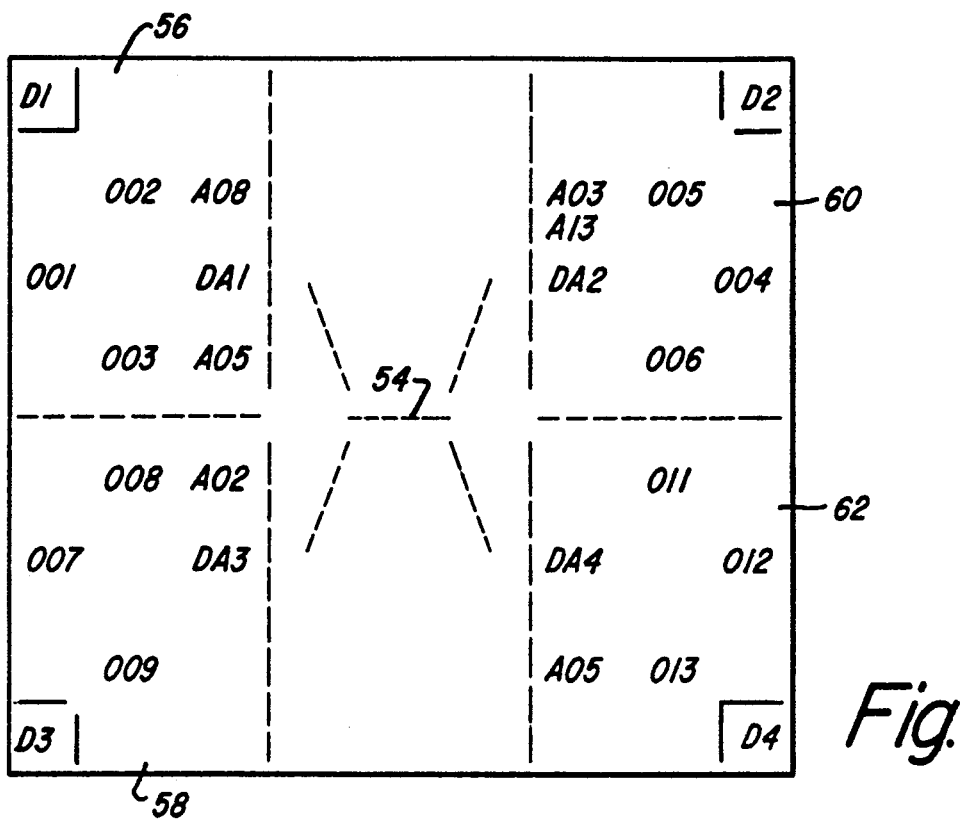
FIG. 3 is a schematic illustration of a bridge between a plurality of virtual storage address spaces which may be utilized to implement the method and system of the present invention.

FIG. 3 is a schematic illustration of a bridge between a plurality of virtual storage address spaces or domains. Tools known as files and pipes are utilized for interdomain communication. A file is typically a data set stored on an external media such as auxiliary memory. A plurality of processes can concurrently open a file. Thus data can be shared through a file. A pipe is typically stored in computer memory 22 but otherwise behaves as a file would. Since pipes and files can be shared by applications they can be used as a bridge between domains. The system and method of the present invention making such use transparent to the user. Numeral 54 indicates the logical relationship of shared file or pipe to four domains 56, 58, 60, and 62. Each domain includes a plurality of objects, including exactly one domain agent DA1, DA2, DA3, and DA4 through which access to bridge 54 is obtained by an object within a domain. Domains 56-62 further include various operational objects (Oxx), which may assume the roles of source and target objects, and agent objects (Axx) for objects acting as sources or targets in other domains.

Figure 4:
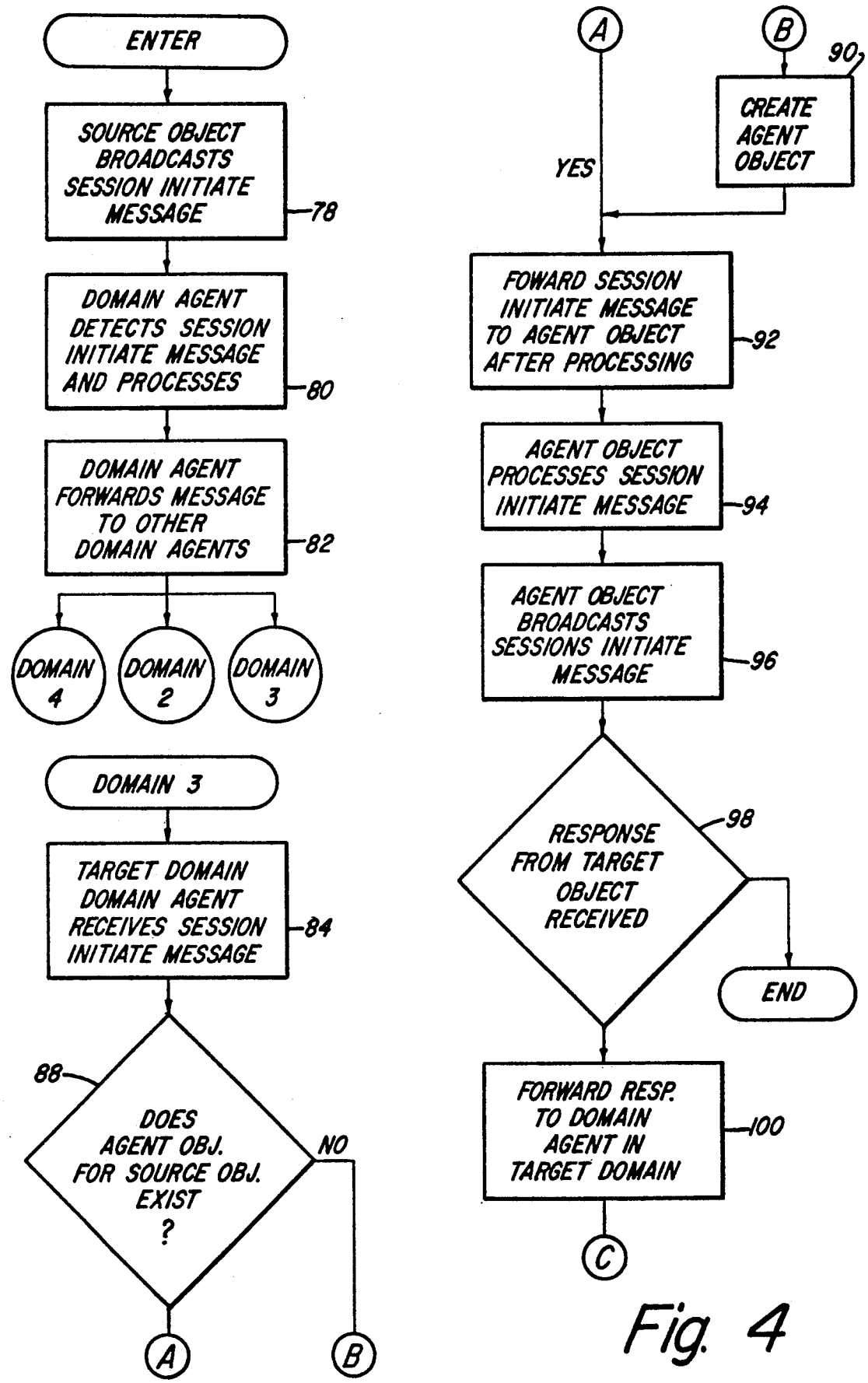
FIG. 4 and 4A are high level logical flow chart of illustrating a software implementation of a technique for establishing a session between two objects in different virtual storage address space domains.
Figure 4A:
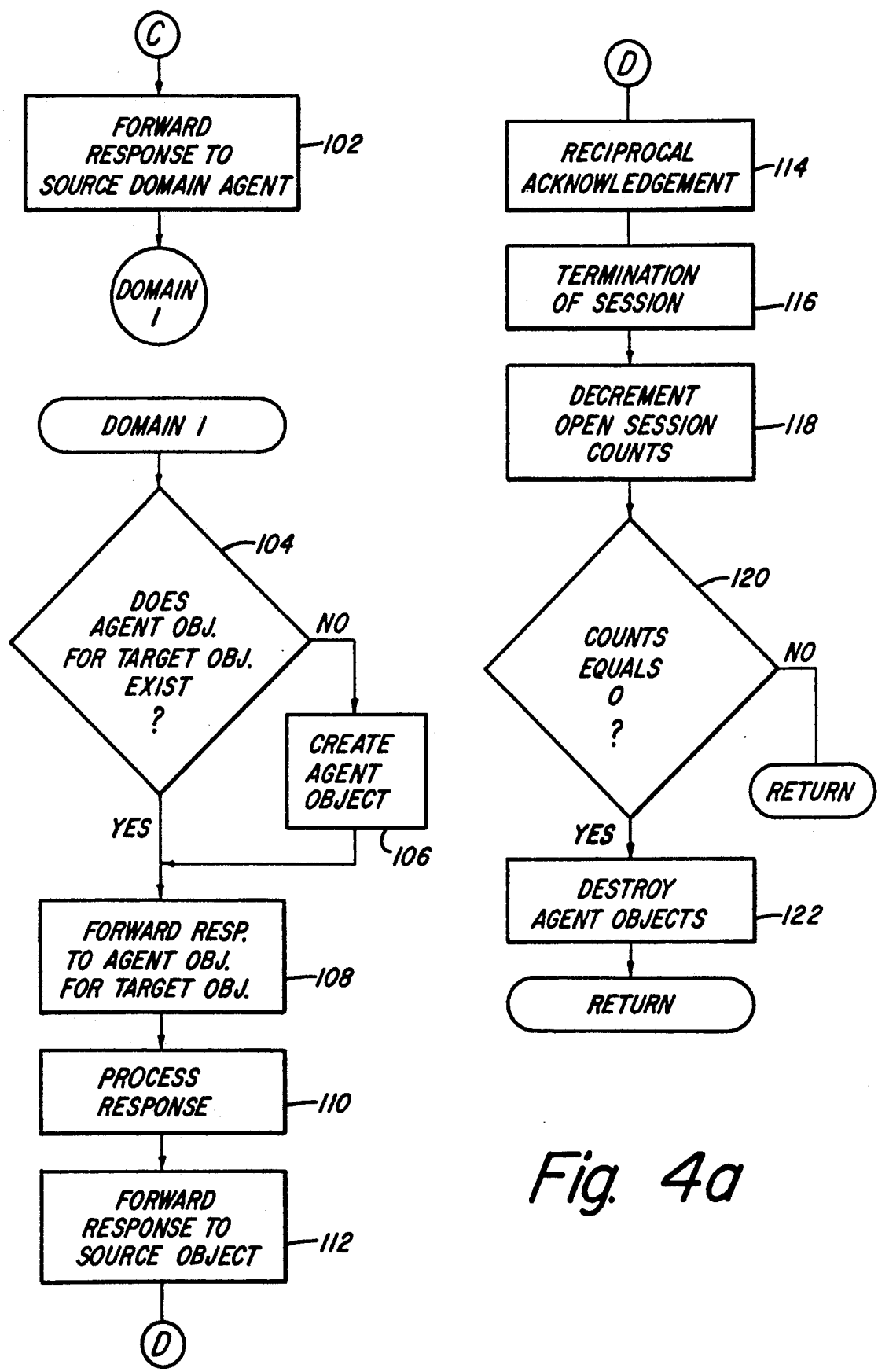

FIG. 4 is a high level logical flow chart of illustrating a software implementation of a technique for establishing a session between object 002 running in domain 1 (indicated by numeral 56) and object 008 running in domain 3 (indicated by numeral 58). The process is entered at step 78 with broadcast from object 002 of a SESSION_INITIATE message throughout domain 56. The domain agent DA1 can process (step so) and always forwards (step 82) the message to all other domain agents DA2, DA3, and DA4. Domain agent DA1 can at step 80, if appropriate, add a unique identifier to the SESSION_INITIATE message, usually a number incremented from a prior forwarded message. The multiple domains can operate a synchronously and thus there is no guarantee that a response to the message will be received before an unrelated inbound message is received, possibly from the domain holding the target object. Utilization of unique identifiers allows related messages to indicate that relationship.

Only the response of domain 58, the location of the target object, is described below. Upon receipt of the SESSION_INITIATE message (step 84), the domain agent for domain 58 determines at step is whether an agent object for the source object exists within domain 58. If no agent object exists step 90 is executed to create one. Creation of an agent object includes recording in the agent object of records for any addressing or routing data needed to send messages back to domain 56 and the source object. At step 90, after identification of an existing agent object, or its creation, the message is forwarded to the agent object identified by the numeral A02 preferably, a count of the number of open sessions through the agent object is maintained in domain agent DA3 or possibly in the agent object A02 itself. The session count relates to termination of the agent object, discussed below.

Upon receipt of the SESSION_INITIATE message, at step 94 agent object A02 creates copies of any data sent along with the message. Next, at step 96, agent object A02 broadcasts the SESSION_INITIATE message within domain 58. Here assume that only object Oos responds to the broadcast messages. Object 008 will generate a SESSION_INITIATE_ACK message to agent object A02 indicating acceptance of a session (step 98). At step agent object A02 forwards the acknowledge message to Domain Agent DA3 (step 100) utilizing the routing information previously recorded. At step 102 domain agent DA3 returns the acknowledge message domain agent DA1.

Domain 56 may receive acknowledge responses from none, one or a plurality of other domains. From step 104 the response in domain 56 to receipt of an acknowledge message from an object 008 in domain 58 is illustrated. At step 104 domain agent DA1 determines if an agent object for the responding object in domain 58 exists in domain 56. If no agent object exists, agent object A08 is created at step 106 and records routing information back to object 008. Next, at step 108 domain agent DA1 forwards the acknowledge message to agent object A08. At step 110 any data sent with the acknowledge message is recorded and at step 112 the acknowledge message is forwarded to source object 002. Agent object A08 sets the address of the message to indicate itself as the sending object and makes a copy of any data sent with the message.

Reciprocal indications of success are then sent (step 114). Beginning with source object 002, a reply indicating in success is sent to agent object A08. Agent object A08 forwards the reply to target object 008 via domain agent DA1, domain agent DA3, and agent object A02. Object 008 then replies to the SESSION_INITIATE message by sending a message to the source object through the reverse of the above sequence of objects. With this operation the initiation of a session is completed and data may be exchanged between source and target object. It may be noted that most and possibly all objects are entered recursively. To maintain system integrity, a Last-In/First Out order of reply to messages is followed. To insure LIFO ordering is maintained, each outgoing message receives a unique identifier, as indicated above, which allows scanning upon return of a reply to match outgoing and incoming messages.

When the last session involving a source object and one or more target objects in a domain is concluded, the agent objects for the source and target objects are destroyed to reduce the demands on computer memory 18. Generally, when the last session involving a particular source object and target objects in a domain is concluded, the agent objects associated with those sessions are also destroyed. This is illustrated beginning at step 116. At step 116 a session between a source object and a particular target object in a domain occurs. At step 118 the count of the number of sessions involving the agent object for the source object is decremented. Next, at step 120, the count is compared to zero. If the count is greater than zero, no action is taken. If the count is zero, indicating no open sessions between the agent object and targets in the domain, at step 122 the agent object for the source object in the domain is destroyed and the agent objects in the source domain for the targets are also destroyed. Alternatively, agent objects may be destroyed based upon lack of communication through the object for longer than some predetermined minimum period.

EXAMPLE EMBODIMENTS

The system and method of the invention have specific applicability to personal computer systems in which a presentation layer overlays the computer operating system for providing an environment for application programs to run. Examples of such systems are the "Windows" product available from Microsoft Corporation and the "Presentation Manager" system available from International Business Machines Corporation. Both products generate a graphical user interface (GUI) for presentation of data to users. The multiple virtual DOS machines discussed above can be started in their own frames provided by the GUI.

"Windows" applications, i.e. processes running in individual frames provided by the interface can communicate among themselves over a protocol called "Dynamic Data Exchange" (DDE). The system and method of the present invention extends the breadth of communication provided by DDE to exchange of information between objects in different virtual address space domains. Another product providing communication between applications running in a "Windows" environment in a single domain is called "Clipboard".

Figure 5:
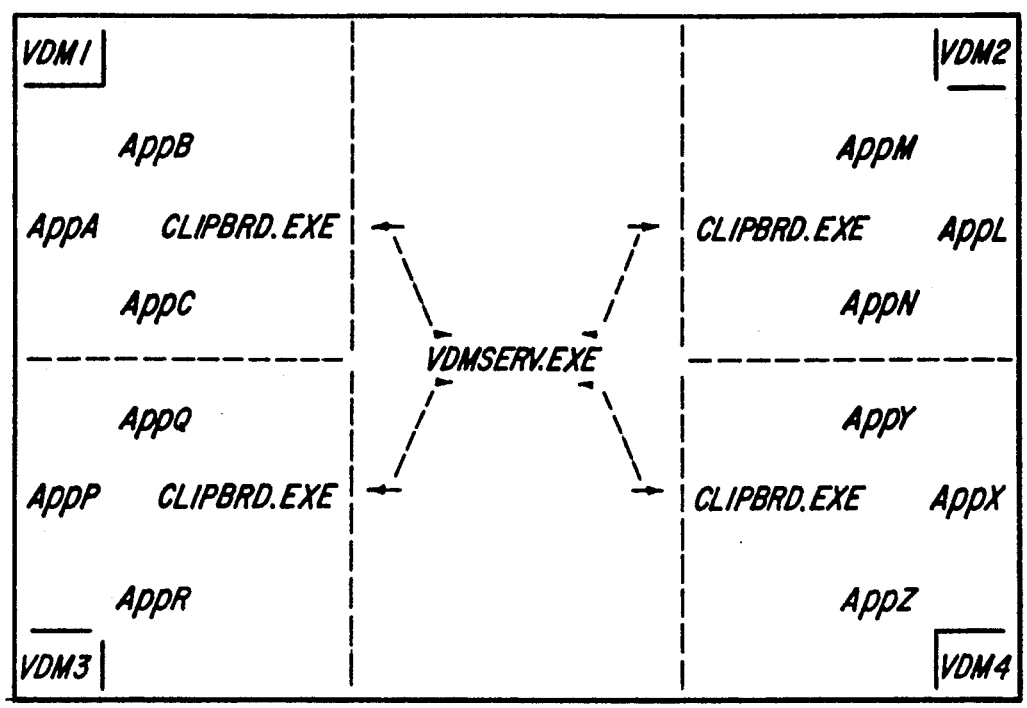
FIG. 5 is a schematic illustration of a bridge utilizing a specific product between a plurality of virtual storage address spaces which may be utilized to implement the method and system of the present invention.
Figure 6:
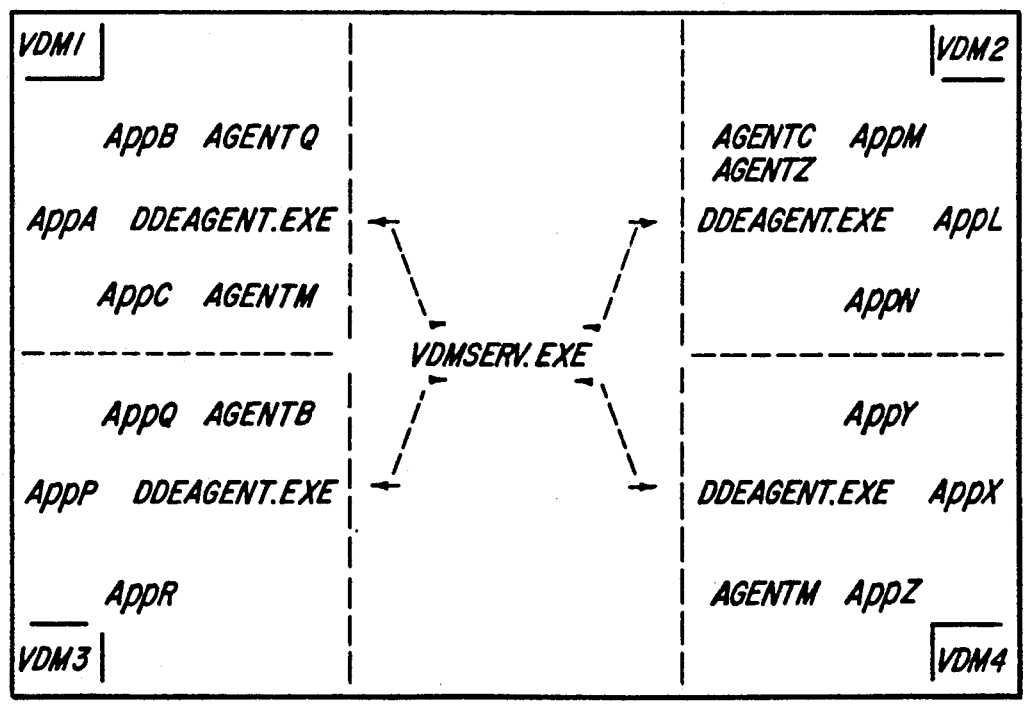
FIG. 6 is a schematic illustration of a bridge utilizing a specific product between a plurality of virtual storage address spaces which may be utilized to implement the method and system of the present invention.

Referring generally to FIGS. 5 and 6, there are illustrated environments for communication between multiple virtual DOS machines. In FIG. 5 a Windows application (CLIPBRD.EXE) is started and acts as domain agents in the various domain. In FIG. 6 Windows application, called the Dynamic Data Exchange Interchange Agent (DDEAGENT.EXE), is started and acts as the domain agents. Communication with applications outside of a VDM occurs through a feature called "Named Pipes". A named pipe is a special file with a name that starts with the characters "PIPE". Other characters can be added to make the pipe name unique (for example, CLIPBRD.EXE uses the pipe named PIPECLPAGENT and DDEAGENT.EXE uses a pipe named PIPEDDEAGENT). Once the named pipe is opened it can be read or written to. The same pipe name can be opened multiple times.

A VDM is permitted to communicate to a native (i.e. operating system) application only via the named pipe. It cannot communicate directly to another VDM through a named pipe. This embodiment solves this problem by creating a native application, called the Protect Mode Server (VDMSERV.EXE), that acts as a bridge between named pipes from VDMs.

VDMSERVE.EXE receives messages from a source VDM (say VDM1) and forwards them to a target VDM (say VDM4). It does this by first opening pipes to VDM1 and VDM4. It then receives the message from VDM1 and sends the message to VDM4.

The applications in the VDMs use the normal DOS "Open File", "Handle Read" and "Handle Write" functions to access the pipe. Handle write sends messages and handle read receives messages.

DDE between Windows applications requires no storage in VDMSERV.EXE. Data read from an instance of the PIPEDDEAGENT pipe is immediately written to another instance of the PIPEDDEAGENT pipe and erased. To support clipboards, VDMSERV keeps a copy of all data written to an instance o the PIPECLPAGENT pipe. Other VDMs access the clipboard by reading this copy through their instances of PIPECLPAGENT.

The agents in each VDM and VDMSERV.EXE communicate with a new protocol that has three main message types:

| | |
|---|---|
| PIPEMSG | This is a representation of a DDE request message as it flows across a pipe. |
| PIPEANS | This is a representation of a reply to a DDE request message as it flows across a pipe. |
| PIPECMD | This is a representation of a command message between CLIPBRD.EXE and/or DDEAGENT.EXE and VDMSERV.EXE as it flows across the pipe. |

The detailed protocol is included for reference in Table 1 in a listing in the "C" language.

TABLE 1

```
// Include file for WINAPP define PIPE_DDE    "\\pipe\\ddeagent"
define PIPE_CLIP   "\\pipe\\clpagent"
#define PIPE_GOPM   "\\pipe\\clpagent"

typedef WORD HVDM;

define ERROR_INVALID_PACKET_TYPE -1 typedef struct TagPIPEMSG               // Piped Windows
                                        //   Message
    {
    DWORD length;                       // length of this
                                        //   packet
                                        //   (includes
                                        //   data)
    WORD tag;                           // identifies this
                                        //   structure
    #define PIPEMSGTAG                  // This is a Pipe
            ('P'*256+'M')               //   Message
    WORD wCmd;                          // command
    DWORD sequence;                     // message sequence
                                        //   number
    HVDM hSourceVdm;                    // requester VDM
                                        //   handle
    HVDM hTargetVdm;                    // server VDM
                                        //   handle
    HWND hWnd;                          // agent window
                                        //   handle
    HWND hWndApp;                       // app window
                                        //   handle
    WORD wAckMsg;                       // windows message
                                        //   causing
                                        //   WM_DDE_ACK,
                                        //   else unknown
    WORD wMsg;                          // windows message
    WORD wParm;                         // window word
```

```
    DWORD lParm;            // window long
                               parameter
    WORD cStrings;          // number of
                               strings
                               included in
                               data
    WORD cGlobals;          // number of data
                               items included
                               in data
                            // other data my
                               follow based
                               on wMsg
} PIPEMSG;

typedef struct TagPIPEDATA      // data item header
{
    DWORD length;           // length (includes
                               this header)
    HANDLE hItem;           // original data
                               handle for the
                               item
    WORD wType;             // data type
#define PM_ISGLOBAL_
        FIRST           0   // first data
#define PM_ISGLOBAL     0   // data is raw data
#define PM_ISOGLOBAL_
        LAST            0   // last data
#define PM_ISSTRING_
        FIRST           1   // first string
#define PM_ISSTRING     1   // data is an
                               ASCIIZ string
                               (no padding)
#define PM_ISATOM_
        WPARM           2   // data is an
                               ASCIIZ atom
                               (no padding)
#define PM_ISATOM_
        LPARMHI         3   // data is an
                               ASCIIZ atom
                               (no padding)
#define PM_ISATOM_
        LPARMLO         4   // data is an
                               ASCIIZ atom
                               (no padding)
#define PM_ISFORMAT     5   // data is an
                               ASCIIZ
                               clipboard
                               format
#define PM_ISSTRING_
        LAST            5   // last string
                            // data follows
} PIPEDATA;
define MAX_PIPESTRING    255  // longest string typedef struct TagPIPESTRING    // string item
                                   header
{
    BYTE achData[MAX       // string image
```

```c
          PIPESTRING+1];       (including
    } PIPESTRING;                ending 0)

typedef struct TagPIPEGLOBAL    // global item
                                   header
    {
      WORD hMem;                // must save and
                                   send back to
                                   sender
      WORD wFlags;              // flags if copy
                                   needs to be
                                   made
                                // data follows
    } PIPEGLOBAL;

typedef struct TagPIPEGLOBALDATA  // global item
                                     header
    {
      BYTE achData[1];          // global image
    } PIPEGLOBALDATA;

typedef struct TagPIPEANS       // Piped Windows
                                   Message Answer
    {
      DWORD length;             // length of this
                                   packet
                                   (includes
                                   data)
      WORD tag;                 // indentifies this
                                   structure
      #define PIPEANSTAG        // This is a Pipe
          ('P'*256+'A')            Answer
      WORD wCmd;                // command
      DWORD sequence;           // message sequence
                                   number
      HVDM hTargetVdm;          // server VDM
                                   handle
      HVDM hSourceVdm;          // requester VDM
                                   handle
      DWORD dwResult;           // windows message
                                   response
    } PIPEANS;

typedef struct TagPIPECMD       // Piped Server
                                   request/respon
                                   se
    {
      DWORD length;             // length of this
                                   packet
      WORD tag;                 // indentifies this
                                   structure
      #define PIPECMDTAG        // This is a Pipe
          ('P'*256+'R')            Request
      WORD wCmd;                // command
      WORD wRetCode;            // return code
      WORD wParm1;              // word parameter
```

```
    WORD  wParm2;                              // word parameter
    DWORD lParm;                               // long parameter
                                               //     (reserved)
                                               // other data my
                                               //     follow on wCmd
) PIPECMD;
// Client initiated messages
// PIPEMSG and PIPEANS streams may be intermixed.
// (i.e. an agent may receive an inbound PIPEMSG before
// a PIPEANS from a previous outbound PIPEMSG.)

// The Server must respond to any PIPECMD messages from
// an agent before any other PIPEMSG or PIPEANS is sent
// to that agent.  (i.e., these are immediate
// commands.)

// sent using PIPEMSG, PIPEANS define PM_SENDMSG              0       // Exported
                                                SendMessage
#define PM_ SENDMESSAGE         0       // alternate name
// To Server   : hVdm           - destination VDM (-1 for
//                                      all)
// To Agent    : hWnd           - handle to target app
//                                      windows
//                                      (-1 for broadcast)
//               sequence       - connects PIPEANS to
//                                      original PIPEMSG must
//                                      be carried from source
//                                      to target and back
//               wMsg           - message ID
//               wParm          - message parameter (message
//                                      specific)
//               lParm          - message parameter (message
//                                      specific)
//               <data>         - data follows if cStrings |
//                                      cGlobals >0
// From Agent : dw Result       - return value // sent using PIPECMD define PM_RELEASEFOCUS         1       // release focus
                                                from me
// To Server   :                - no parameters
// From Server: wRetCode        - 0 define PM_OPENCLIPBOARD        3       // open server
                                                clipboard
// To Server   : wParm1         - open mode
#define OPEN_READ 0x0001                // will read
                                                clipboard
#define OPEN_WRITE 0x0002               // will write
                                                clipboard
// From Server: wRetCode        - 0=opened, 10=not available
                                        now
```

```
#define PM_CLOSECLIPBOARD       4       // close server
                                                clipboard
// To Server   : -----
// From Server: wRetCode  - 0=closed, 10=not open by
                                requestor define PM_EMPTYCLIPBOARD       5       // empty server
                                                clipboard
// To Server   : -----
// From Server: wRetCode  - 0=emptied, 10=not open by
                                requestor define PM_READCLIPBOARD        6       // get clipboard
                                                data
// To Server   : lParm    - read count (-1=entire file)
// From Server: wRetCode  - 0=no error, 10=error
//              lParm     - count read
//              <data>    - data define PM_WRITECLIPBOARD       7       // put clipboard
                                                data
// To Server   : lParm    - write count (-1=entire
                                file)
//              <data>    - data
// From Server: wRetCode  - 0=no error, 10=error
//              lParm     - count written define PM_LSEEKCLIPBOARD       8       // change position

// To Server   : lParm    - desired position (plus seek
                                type)
//              wParm1    - seek type 0=BOF, 1=CUR,
                                2=EOF
#define SEEK_BOF                0       // seek from
                                                beginning of
                                                the file
#define SEEK_CUR                1       // seek from the
                                                current
                                                position
#define SEEK_EOF                2       // seek from end of
                                                file
// From Server: wRetCode  - 0=no error, 10-error
//              lParm     - new position // Server initiated messages, sent by PIPECMDs define PM_VDMTERMINATED        10      // another VDM
                                                (really pipe)
                                                closed
// From Server: wRetCode  - 0
//              wParm1    - VDM id
// To Server   :          - no response expected define PM_IDENTIFYVDM          12      // VDM ID, present
                                                after pipe
                                                open only
```

```
// From Server:  wRetCode  - 0
//               wParm1    - VDM id
// To Server :             - no response expected define PM_CLIPBOARDCHANGED    11    // Clipboard
                                            changed by
                                            another user // From Server:  wRetCode  - 0
// To Server :             - no response expected define MAXPIPEBLOCK max(sizeof(PIPEMSG),
    max(sizeof(PIPEANS, sizeof(PIPECMD)))
```

An alternative transport mechanism between virtual DOS machines could be based upon virtual device driver 46. As described above, driver 46 emulates hardwater devices, providing virtual disk drives among other peripheral devices to each virtual machine. Accordingly, each virtual machine has access, through the visual diver, to all real hardware resources of computer system 10. A virtual device driver can be utilized to map pages of memory in one domain into the address space in another domain. Since no actual data movement would occur, the approach would be faster than using named pipes.

While the invention has been particularly shown and described with reference to a preferred embodiment, it will be understood by those skilled in the at that various changes in form and detail may be made therein without departing from the spirit and scope o the invention.

What is claimed is:

1. A method of passing data between objects located distributed among a plurality of visual address spaces constituting domains established by processes executing on a data processing system, the method comprising the steps executed by the data processing system of:

broadcasting a session initiation message from a source object in a first domain to objects in the first domain;

responsive to receipt of the session initiation message by a domain agent of the first domain, forwarding the session initiation message from the domain agent for the first domain via a pipe or virtual device driver to a domain agent for a second domain;

responsive to receipt of the session initiation message by the domain agent for the second domain, transmitting the session initiation message from the domain agent for the second domain to an agent object of the source object in the second domain; and responsive to receipt of the session initiation message by the agent object for the source object, establishing a session between the agent object for the source object and a target object for passage of data.

2. A method of passing data between objects located distrusted among a plurality of virtual address spaces established by processes executing on a data processing system as set forth in claim 1, the method further comprising the step executed by the data processing system of:

transmitting an acknowledge message from eh target object to the agent object for the source object;

responsive to receipt of the acknowledge message by the agent object for the source object, transition the knowledge message from the gent object for the source object to a domain agent for the second domain;

responsive to receipt of the acknowledge message by the domain agent of the second domain, transmitting the acknowledge message to th domain gate for the first domain over the pipe or a virtual device driver;

responsive to receipt of the acknowledge message by the domain agent for the first domain, transmitting the acknowledge message to an agent object of the target agent in the first domain;

responsive to receipt of the acknowledge message by the agent object for the target object, establishing a session between the agent object for the target object and the source object for passage of data.

3. A method of passing data between objects located distributed among a plurality of virtual address spaces established by processes executing on a data processing system as set forth in claim 2, wherein the step of transmitting the session initiation message from the domain agent for the second domain to the agent object for the source object in the second domain comprises:

responsive to receipt of the session initiation message by the domain agent for the second domain, determining if the agent object for the source object exists in the second domain;

if the agent object for the source object does not exist, creating the gent object for the source object;

causing the end object of the source object to broadcast the session initiation message within the second domain; and responsive to receipt of the session initiation message by an object within the second domain, making a determination for the object as to whether to respond to the session initiation message or to ignore the session initiation message.

4. A method of passing data between objects located distributed among a plurality of virtual address spaces established by process executing on a data processing system as set forth in claim 3, wherein the step of forwarding the session initiation message from the domain agent of the first domain to the domain agent for the second domain further includes:

adding an identifier to the session initiation message for inclusion in a response message thereto.

5. A method of passing data between objects located distributed among a plurality of virtual address spaces established by process executing on a data processing system as set forth in claim , the method further comprising the steps executed by the data processing system of:

transmitting a reply message from the target object to the gent object of the source object;

responsive to receipt of the reply message by the agent object for the source object, transmitting the reply message from the agent object for the source object to a domain agent for the second domain;

responsive to receipt of the reply message by the domain agent for the second domain, transmitting the reply message to the domain agent for the first domain;

responsive to receipt of the reply message by the domain agent for the first domain, transmitting the reply message to a first domain agent object for the target agent, if a first domain agent object is exists;

if no first domain agent object for the target object, creating a first domain agent object for the target object and transmitting the reply message to the first domain agent object;

responsive tot receipt of the reply message by the agent object for the target object, forwarding the reply message form the first domain agent object for the target object to the source object.

6. A data processing system for transferring data between virtual storage domains, the data processing system comprising:

means for broadcasting a session initiation message from a source object in a first visual storage domain to objects in the first virtual storage domain;

means responsive to receipt of the session initiation message by a domain agent for the firs virtual storage domain for forwarding the session initiation message from the domain agent for the first virtual storage domain to a domain agent for a second virtual storage domain;

a named pipe for interchange of data between the first and second virtual storage domains;

means responsive to receipt of the session initiation message by the domain agent for the second virtual storage domain for transmitting the session initiation message from eh domain agent for the second virtual storage domain to an agent object in the second visual storage domain for the source object; and means responsive to receipt of the session initiation message by the agent object for the source object for establishing as session between the agent object of the source object and a target object for passage of data.

7. A data processing system as set forth in claim 6 and further comprising:

means for transmitting an acknowledge message from eh target object to the agent object for the source object;

means responsive to receipt of the knowledge message by the agent object of the source object for transmitting the acknowledge message for the agent object of the source object to a domain agent of the second virtual storage domain;

means responsive to receipt of the acknowledge message by the domain agent for the second virtual storage domain for transmitting the acknowledge message to the domain agent for the first virtual storage domain;

means responsive to receipt of the acknowledge message by the domain agent for the first virtual storage domain or transmitting the acknowledge message to an agent object for the target agent in the first virtual storage domain; and means responsive to receipt of the acknowledge message by the agent object for the target object for establishing a session between the agent object for the target object and the source object for passage of data over the named pipe.

8. A data processing system as set forth in claim 6 and further comprising:

means for transmitting a reply message from the target object to the agent object for the source object;

means responsive to receipt of the reply message by the agent object for the source object for tarnsmittin the reply message from the agent object for the source object to a domain agent for the second virtual storage domain;

means responsive to receipt of the reply message by the domain agent for the second virtual storage domain for transmitting the reply message to the domain agent for the first virtual storage domain;

means responsive to receipt of the reply message by the domain agent for the first virtual storage domain for transmitting the reply message to an agent object in the firs virtual storage domain for the target object; and means responsive to receipt of the reply message by the agent object for the target object for forwarding the reply message from the agent object for the target object to the source object.

9. A data processing system as set forth in claim 6, wherein the means for transmitting the session initiation message from the domain agent for the second virtual storage domain to the agent object for the source object tin the second virtual storage domain comprises:

means responsive to receipt o the session initiation message by the domain agent of the second virtual storage domain for determining if the agent object for the source object exists in the second virtual storage domain;

means for determining if the agent object for the source object does exists and creating the agent object for the source object if it does not;

means for broadcasting the session initiation message from eh agent object for the source object within the second virtual storage domain; and means responsive to receipt of the session initiation message by an object within the second virtual storage domain for making a determination for the object as to whether to respond to the session initiation message or to ignore the session initiation message.

10. A data processing system as set forth in claim 9, wherein the means for forwarding the session initiation message from h domain agent for the first virtual storage domain to the domain agent for the second virtual storage domain further includes:

means for adding an identifier to the session initiation message for inclusion in a response message thereto.

11. A data processing system as set forth in claim 10, and further comprising:

means for tracking the number of open sessions between a source object and target objects in a virtual storage domain through an agent object for a source object; and means responsive to the number of open sessions equaling zero for destroying the agent object for the source object and all agent objects for target objects.

12. A data processing system as set forth in claim 10, and further comprising:
   means for timing periods between passage of messages through an agent object; and
   means responsive to a period measured by the timing means exceeding a predetermined threshold for destroying the agent object.

13. A data processing program product for transferring data between a plurality of virtual storage domains, the data processing program product comprising a medium storing:
   instruction means for broadcasting a session initiation message from a source object in a first virtual storage domain to objects in the first virtual storage domain;
   instruction mans responsive to receipt of the session initiation message by a domain agent for the firs virtual storage domain for forwarding the session initiation message from the domain agent for the first virtual storage domain to at least a first domain agent for a second virtual storage domain;
   instruction means for establishing a named pipe for data exchange between virtual storage domains;
   instruction means responsive to receipt of the session initiation message by the domain agent for the second visual storage domain for transmitting the session initiation message from the domain agent for the second virtual storage domain to an agent object in the second virtual storage domain for the source object; and
   instruction means responsive to receipt of the session initiation message by the gent object for the source object for establishing a session between the agent object for the source object and a target object for passage of data.

14. A data processing program product as set forth in claim 13 and further comprising:
   instruction means for transmitting an acknowledge message from the target object to the gent object for the source object;
   instruction means responsive to receipt of the acknowledge message by the agent object for the source object for transmitting the acknowledge message from the gent object for the source object to a domain agent for the second virtual storage domain;
   instruction means responsive to receipt of the acknowledge message by the domain agent for the second virtual storage domain for transmitting the acknowledge message to the domain agent for the first virtual storage domain;
   instruction mans responsive to receipt of the acknowledge message by the domain agent for the first virtual storage domain for transmitting the acknowledge message to an agent object in the first virtual storage domain for the target object; and
   instruction means responsive to receipt of the acknowledge message by the agent object of the target object for establishing a session between the agent object for the target object and the source object for passage of data.

15. A data processing program product as set forth in claim 13 and further comprising:
   instruction means for transmitting a reply message from the target object to the agent object for the source object;
   instruction means responsive to receipt of the reply message by the agent object of the source object foe transmitting the reply message from the agent object for the source object to a domain agent for the second virtual storage domain;
   instruction means responsive to receipt of the reply message by the domain agent for the second virtual storage domain for transmitting the rely message to the domain agent for the first virtual storage domain;
   instruction means responsive to receipt of the reply message by the domain agent for the first virtual storage domain for transmitting the reply message to an agent object in the first virtual storage domain for the target object;
   instruction means responsive to receipt of the reply message by the agent object for the target object for forwarding the reply message from the agent object for the target object and the source object.

16. A data processing program product as set forth in claim 13, wherein the instruction means of transmitting the session initiation message from the domain gent for the second virtual storage domain to the agent object for the source object in the second virtual storage domain comprises:
   instruction means responsive to receipt of the session initiation message by the domain agent of the second virtual storage domain for determining if the agent object of the source object exists in the second virtual storage domain;
   instruction means or determining if the agent object of the source object does exists and certain the gent object of the source object if it does not;
   instruction means for broadcasting the session initiation message from the gent object for the source object within the second virtual storage domain; and
   instruction means responsive to receipt of the session initiation message by an object within the second virtual storage domain for making a determination for the object as to whether to respond to the session initiation message or to ignore the session initiation message.

17. A data processing program product as set forth in claim 16, wherein the instruction means for forwarding the session initiation message from the domain gent for the first virtual storage domain to the domain agent for the second virtual storage domain further includes:
   instruction means for adding an identifier of the session initiation message for inclusion in a response message thereto.

* * * * *

UNITED STATES PATENT AND TRADEMARK OFFICE
CERTIFICATE OF CORRECTION

PATENT NO. : 5,305,461

DATED : April 19, 1994

INVENTOR(S) : Barry A. Feigenbaum, et al.

It is certified that error appears in the above-indentified patent and that said Letters Patent is hereby corrected as shown below:

Col. 4, line 34, please delete "11".

Col. 6, line 64, please change "(step so)" to --step 80--.

Col. 7, line 10, change "is" to --88--.

Col. 7, line 29, change "0os" to --008--.

Col. 20, line 21, change "transition" to --transmitting--.

Col. 19, line 68; Col. 21, lines 44 and 56; Col. 22, line 46; please change "eh" to --the--.

Col. 20, lines 22 and 50; Col. 21, line 6; Col. 23, lines 36, 42 and 47; Col. 24, lines 30, 40, 43 and 55; please change "gent" to --agent--.

Col. 20, line 27, change "gate" to --agent-- and "th" to --the--.

Col. 20, line 51, change "end" to --agent--.

Col. 21, line 2, change "claim ," to --claim 1,--.

Col. 21, line 23, chang "tot" to --to--.

Col. 21, line 34; Col. 22, line 26; and Col. 23, line 20; change "firs" to --first--.

Col. 22, line 37, change "o" to --of--.

Col. 22, line 56, change "h" to --the--.

UNITED STATES PATENT AND TRADEMARK OFFICE
CERTIFICATE OF CORRECTION

PATENT NO. : 5,305,461                                    Page 2 of 3
DATED      : April 19, 1994
INVENTOR(S): Barry A. Feigenbaum, et al.

It is certified that error appears in the above-indentified patent and that said Letters Patent is hereby corrected as shown below:

Col. 23, line 19, change "mans" to --means--.

Col. 21, line 46 and Col. 23, line 29, change "visual" to --virtual--.

Col. 23, line 55, change "mans" to --means--.

Col. 21, line 25, change "form" to --from--.

Col. 21, line 60, change "for" to --from--.

Col. 22, line 15, change "transmittin" to --transmitting--.

Col. 22, line 2, change "or" to --for--.

Col. 19, line 47; Col. 21, lines 61 and 62; Col. 22, line 38; Col. 23, line 61; and Col. 24, lines 40 and 41; please change "of" to -- for--.

Col. 24, line 11, change "foe" to --for--.

Col. 24, line 16, change "rely" to --reply--.

UNITED STATES PATENT AND TRADEMARK OFFICE
CERTIFICATE OF CORRECTION

PATENT NO. : 5,305,461

DATED : April 19, 1994

INVENTOR(S) : Barry A. Feigenbaum, et al

It is certified that error appears in the above-indentified patent and that said Letters Patent is hereby corrected as shown below:

Col. 24, line 40, change "certain" to --creating--.

Signed and Sealed this

Sixth Day of September, 1994

Attest:

BRUCE LEHMAN

Attesting Officer

Commissioner of Patents and Trademarks